US010395331B2

(12) United States Patent
Deffeyes et al.

(10) Patent No.: US 10,395,331 B2
(45) Date of Patent: Aug. 27, 2019

(54) SELECTIVE RETENTION OF FORENSIC INFORMATION

(71) Applicant: INTERNATIONAL BUSINESS MACHINES CORPORATION, Armonk, NY (US)

(72) Inventors: Suzanne C. Deffeyes, Weaverville, NC (US); Amir Khan, Brookfield, CT (US); Charles S. Lingafelt, Durham, NC (US); Gary K. Thornton, Carrollton, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 704 days.

(21) Appl. No.: 14/959,491

(22) Filed: Dec. 4, 2015

(65) Prior Publication Data

US 2017/0161858 A1 Jun. 8, 2017

(51) Int. Cl.
*G06F 17/30* (2006.01)
*G06Q 50/26* (2012.01)

(52) U.S. Cl.
CPC .................................... *G06Q 50/26* (2013.01)

(58) Field of Classification Search
None
See application file for complete search history.

(56) References Cited

U.S. PATENT DOCUMENTS 8,311,973 B1 * 11/2012 Zadeh ...................... G06N 7/02 706/62
2002/0103980 A1 8/2002 Crockett et al.
2006/0075007 A1 * 4/2006 Anderson ............. G06F 3/0608

OTHER PUBLICATIONS

Hassanzadeh et al. "The xCurator Project," University of Toronto, http://dblab.cs.toronto.edu/project/xcurator/, May 25, 2011, pp. 1-2.

* cited by examiner

*Primary Examiner* — Tuankhanh D Phan
(74) *Attorney, Agent, or Firm* — Cantor Colburn LLP; David Zwick

(57) ABSTRACT

Embodiments include method, systems and computer program products for selective retention of data in a computational system. Aspects include receiving a monitored data element. Aspects also include assigning an initial storage ranking to the monitored data element to create a ranked data element. Aspects also include determining a threshold storage ranking. Aspects also include comparing the initial storage ranking to the threshold storage ranking. Aspects also include, based on the comparison indicating that the initial storage ranking is greater than the threshold storage ranking, storing the ranked data element in a long-term storage. Aspects also include based upon the comparison indicating that the initial storage ranking is less than the threshold storage ranking, discarding the ranked data element.

18 Claims, 8 Drawing Sheets

SELECTIVE RETENTION OF FORENSIC INFORMATION

BACKGROUND

The present invention relates to retention of forensic information, and more specifically, to methods, systems and computer programs for selective retention of data in long-term storage.

Increasingly larger amounts of electronic data are generated and shared within enterprises and across networks. Retaining such large amounts of data can be useful for a variety of purposes, including for forensic purposes, business purposes, or security purposes. For example, security monitoring and forensic investigation require the ability to replay network activity between devices on a network. To accomplish this, large amounts of data, including full packets of data or a data flow across a network, are captured. In a monitored network, the large amounts of data can be captured and saved in a high capacity data system as the data flows across a network across a network interface.

Retaining such data requires an ever increasing storage capacity and can also detrimentally impact performance of computing systems. Conventional data retention systems can rely upon time based decisions on whether to discard captured data or can otherwise use manual analysis and inspection of historical data which can be tedious, time consuming, and cost prohibitive. At the same time, much of the data that is initially stored or captured is not needed. Moreover, over time and as conditions change, some data can become less valuable and more amenable to deletion while other data retains its value for forensic, security, or business purposes. Thus, time based retention of such data could lead to undesirable loss of valuable data.

SUMMARY

According to an embodiment, a method for selective retention of data is provided. The method includes receiving a monitored data element. The method also includes assigning an initial storage ranking to the monitored data element to create a ranked data element. The method also includes determining a threshold storage ranking. The method also includes comparing the initial storage ranking to the threshold storage ranking. The method also includes, based on the comparison indicating that the initial storage ranking is greater than the threshold storage ranking, storing the ranked data element in a long-term storage. The method also includes based upon the comparison indicating that the initial storage ranking is less than the threshold storage ranking, discarding the ranked data element.

In accordance with another embodiment, a computer program product for selective retention of data includes a non-transitory storage medium readable by a processing circuit and storing instructions for execution by the processing circuit for performing a method. The method includes receiving a monitored data element. The method also includes assigning an initial storage ranking to the monitored data element to create a ranked data element. The method also includes determining a threshold storage ranking. The method also includes comparing the initial storage ranking to the threshold storage ranking. The method also includes, based on the comparison indicating that the initial storage ranking is greater than the threshold storage ranking, storing the ranked data element in a long-term storage. The method also includes based upon the comparison indicating that the initial storage ranking is less than the threshold storage ranking, discarding the ranked data element.

In accordance with a further embodiment, a processing system for selective retention of data includes a temporary storage configured to receive a monitored data element and a processor in communication with the temporary storage. The processor includes an analytics engine configured to assign an initial storage ranking to the monitored data element to create a ranked data element. The processor also includes a data selector configured to determine a threshold storage ranking and compare the initial storage ranking to the threshold storage ranking. The processing system also includes a long-term storage configured to receive the ranked data element. The processor is also configured to, based upon the comparison indicating that the initial storage ranking is greater than the threshold storage ranking, store the ranked data element in the long-term storage. The processor is also configured to, based upon the comparison indicating that the initial storage ranking is less than the threshold storage ranking, discard the ranked data element.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for selective retention of data are provided. In exemplary embodiments, a monitored data element can be received and saved to a temporary storage and an analytics engine can assign an initial storage ranking to the monitored data element. In exemplary embodiments, a threshold storage ranking can be determined and the initial storage ranking of the monitored data element can be compared to the threshold storage ranking. In exemplary embodiments, the monitored data element can be either discarded or stored in a long-term storage based upon the comparison.

Figure 1:
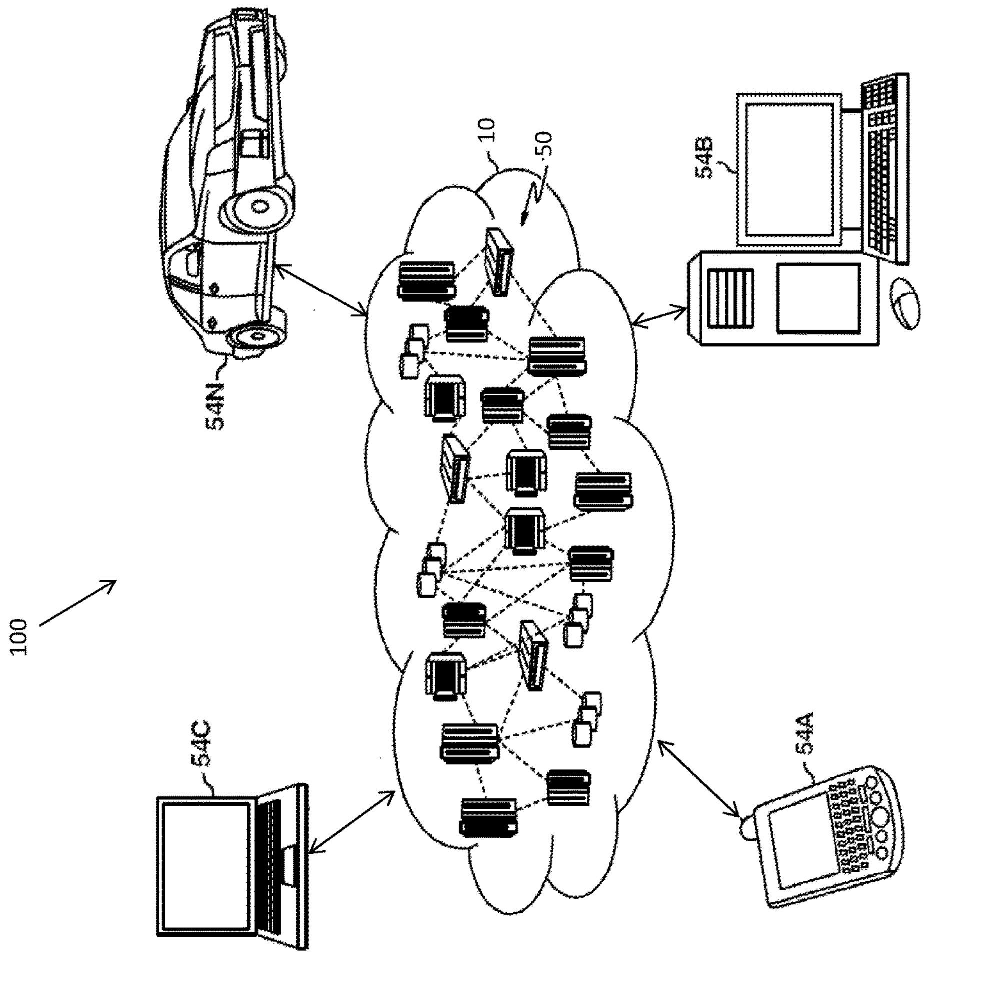
FIG. 1 illustrates a cloud computing environment capable of supporting core logic included in a mobile device data allocation system according to a non-limiting embodiment.

With reference now to FIG. 1, a cloud computing environment 10 capable of supporting the teachings herein is illustrated according to a non-limiting embodiment. As shown, cloud computing environment 10 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. The nodes 50 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 54A-N shown in FIG. 2 are intended to be illustrative only and that computing nodes 50 and cloud computing environment 10 can communicate with any type of computerized device over any type of network and/or network addressable connection (e.g., using a web browser).

Figure 2:
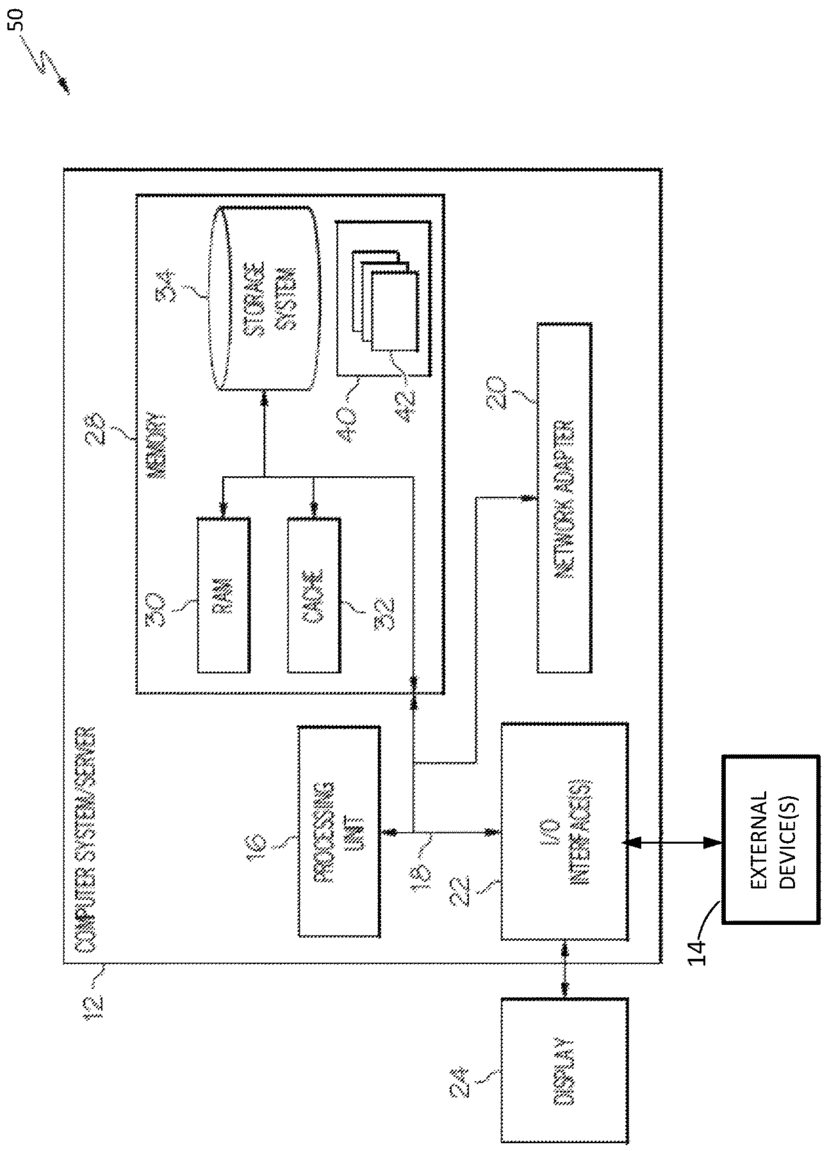
FIG. 2 is a schematic diagram of a cloud computing node included in a distributed cloud environment.

Referring now to FIG. 2, a schematic of a cloud computing node 50 included in a distributed cloud environment or cloud service network is shown according to a non-limiting embodiment. The cloud computing node 50 is only one example of a suitable cloud computing node and is not intended to suggest any limitation as to the scope of use or functionality of embodiments of the invention described herein. Regardless, cloud computing node 50 is capable of being implemented and/or performing any of the functionality set forth hereinabove.

In cloud computing node 50 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 50 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
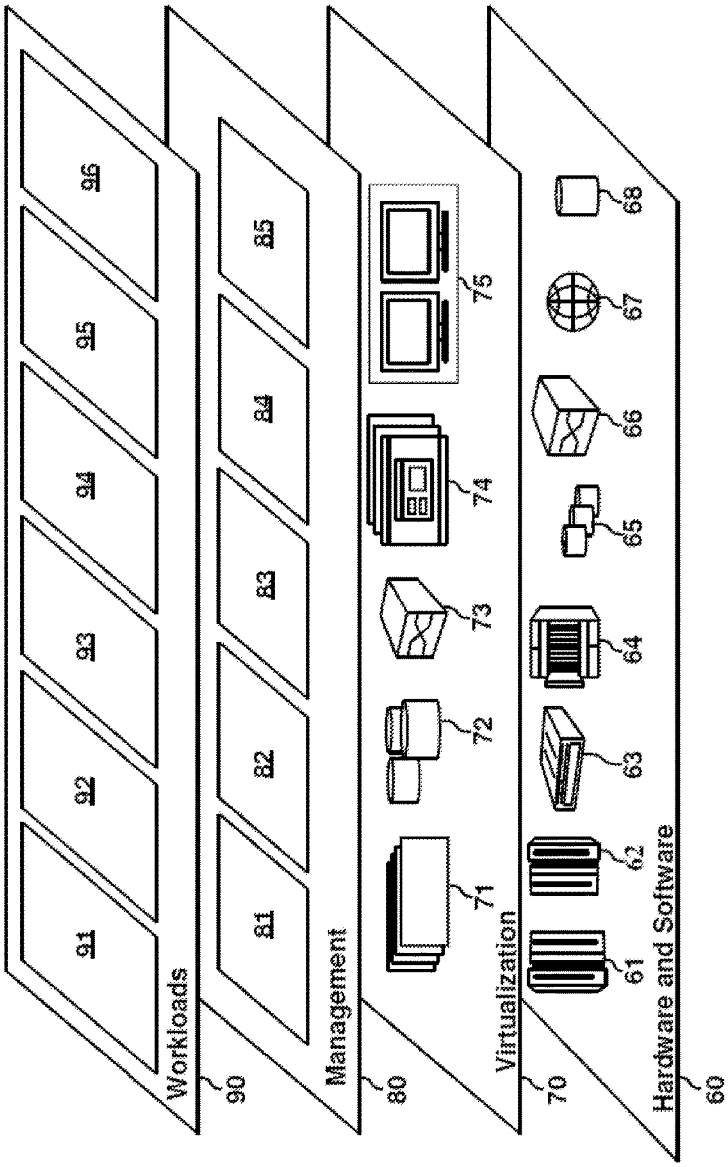
FIG. 3 is a set of functional abstraction layers provided by a cloud computing environment capable of supporting core logic included in a mobile device data allocation system according to a non-limiting embodiment.

Referring now to FIG. 3, a set of functional abstraction layers provided by cloud computing environment 10 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provided pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Although a cloud environment capable of supporting the core logic of the data service network system 100 is described in detail above, it should be appreciated that the core logic of the data service network system 100 can reside locally on one or more of the devices 54A-54N. For instance, each mobile device 54A may have installed locally thereon the core logic of the data service network system 100. In this manner, the mobile devices 54 can perform locally the various features and operations of the data service network system 100.

Figure 4:
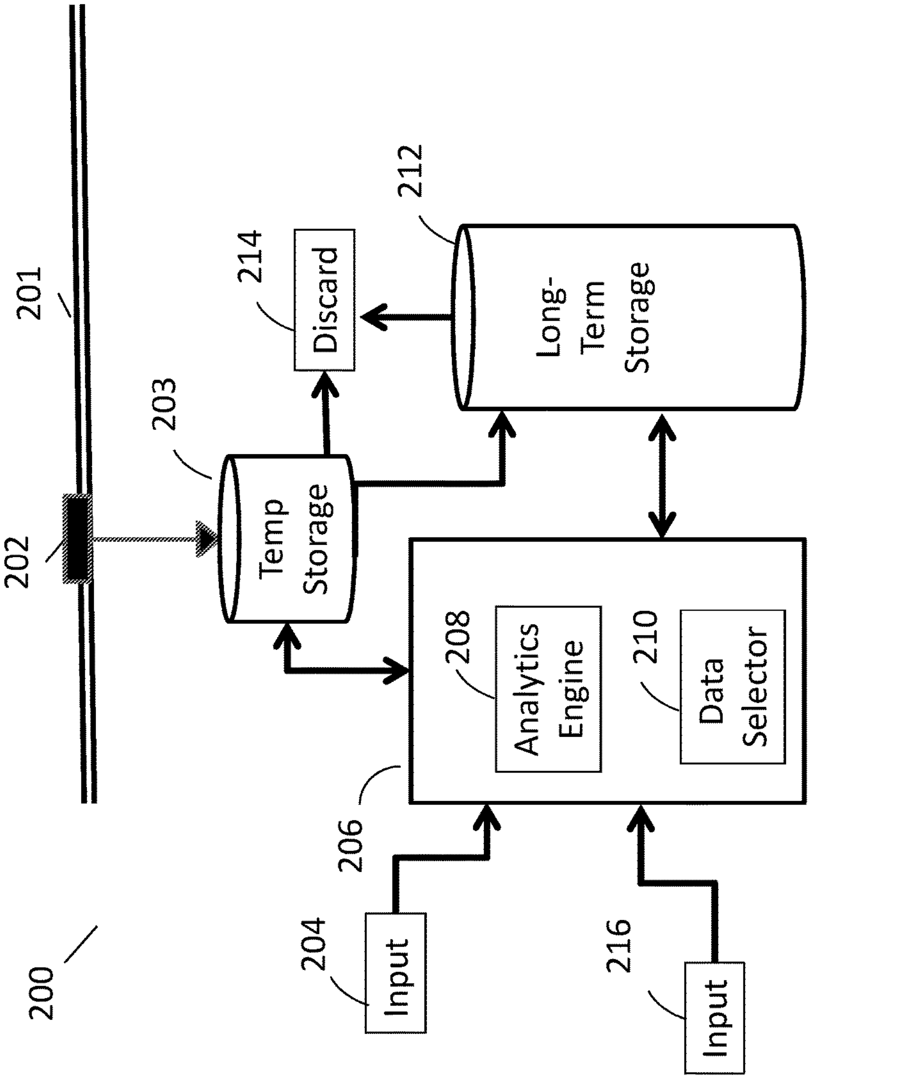
FIG. 4 is a schematic diagram illustrating a processing system for selective retention of data in accordance with an exemplary embodiment.

Referring now to FIG. 4, a schematic of a system 200 for selective retention of data in an exemplary embodiment is illustrated. As illustrated, a monitored data flow 201 includes monitored data elements that flow across and through a network at a network interface 202. The system 200 includes a temporary storage 203 in communication with a processor 206. Processor 206 can include an analytics engine 208 and a data selector 210. System 200, as illustrated, also contains a long-term storage 212. In some embodiments, in operation, a monitored data element is captured at network interface 202 and flows to the temporary storage 203. The monitored data element can then be acted upon by the processor 206. In some embodiments, analytics engine 208 assigns an initial storage ranking to the monitored data element. In some embodiments, the initial storage ranking is based upon input 204 received to the processor. A data selector 210 can set a threshold storage ranking for the network data, which can be compared to the initial storage ranking for the monitored data element. Based upon the results of the comparison, for example, whether the initial storage ranking is higher or lower than the threshold storage ranking, the monitored data element can be discarded 214 from the temporary storage 203 or can alternatively enter the long-term storage 212. Processor 206, as illustrated, remains in communication with long-term storage 212 and can further act on monitored data elements saved to long-term storage 212. For example, a subsequent input 216 can be provided to the processor 206. In some embodiments, in operation, the subsequent input 216 can be used to re-assess the data in long-term storage 212, such that the data can remain in long-term storage 212 or can be discarded from long-term storage 212.

Figure 5:
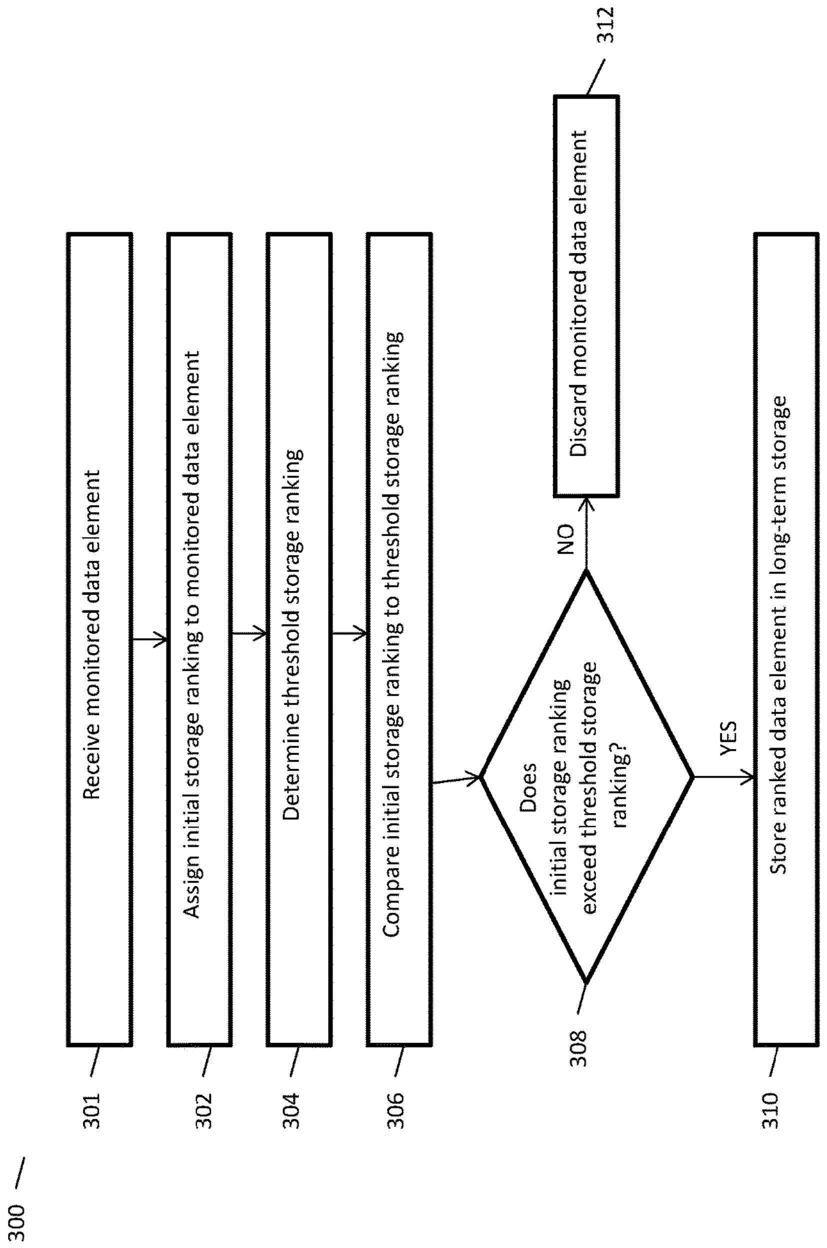
FIG. 5 is a flow diagram of a method for selective retention of data in accordance with an exemplary embodiment.

Referring now to FIG. 5, a flow diagram of a method 300 for selective retention of data in an exemplary embodiment is shown. As shown at block 301, the method 300 includes receiving a monitored data element. Next, as shown at block 302, the method 300 includes assigning an initial storage ranking to the monitored data element. The method 300 also includes determining a threshold storage ranking, as shown at block 304. In some embodiments, the threshold storage ranking is determined after an initial storage ranking to the monitored data element is assigned. In other embodiments in accordance with the disclosure, the threshold storage ranking is determined before the initial storage ranking is assigned or at the same time that the threshold storage ranking is assigned. The method 300 includes comparing the initial storage ranking to the threshold storage ranking, as shown at block 306. In accordance with the method 300, as shown at block 308, if the initial storage ranking exceeds a threshold storage ranking, the ranked monitored data element is stored in long-term storage as shown at block 310. If the initial storage ranking does not exceed the threshold storage ranking, the monitored data element is discarded, as shown at block 312.

Figure 6:
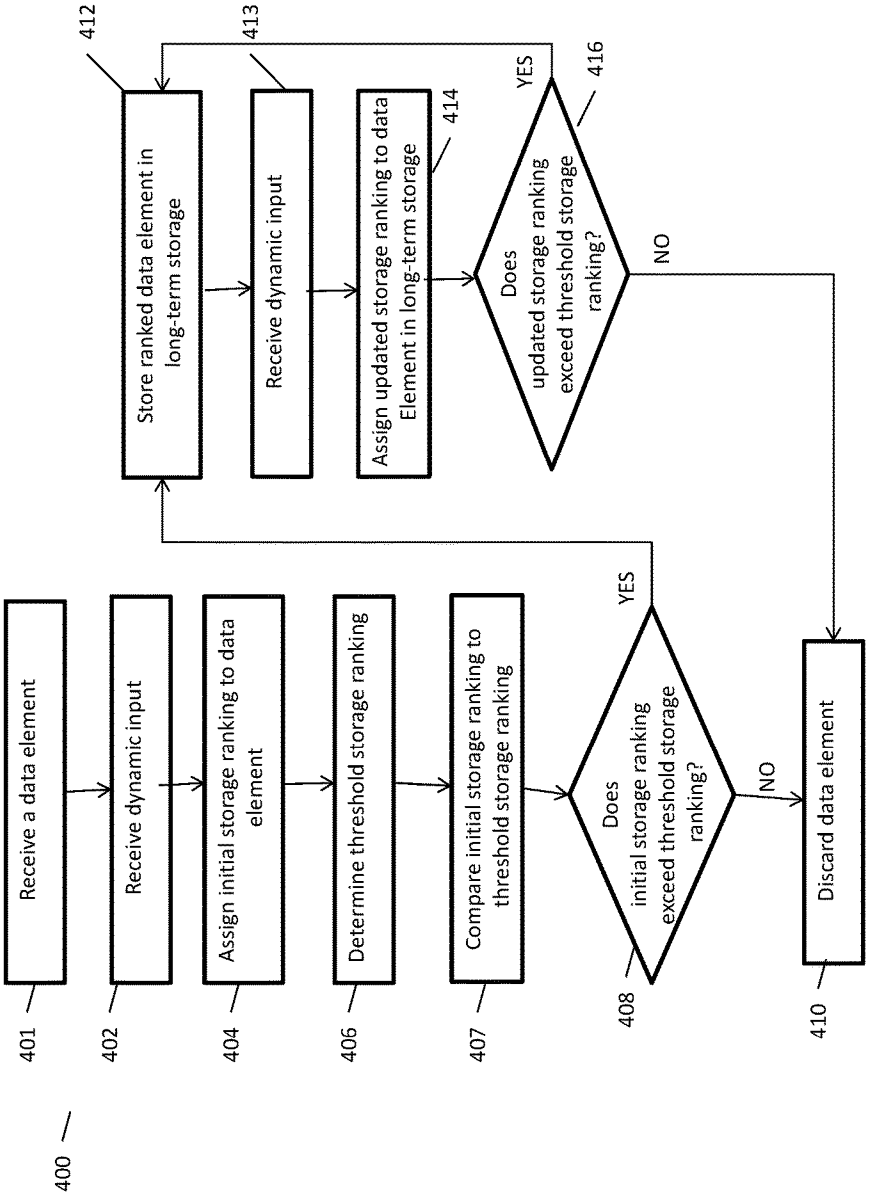
FIG. 6 is a flow diagram of another method for selective retention of data in accordance with an exemplary embodiment.

With reference now to FIG. 6, a flow diagram of a method 400 for selective retention of data in another exemplary embodiment is shown. As shown at block 401, the method 400 includes receiving a monitored data element. Next, as shown at block 402, the method 400 includes receiving a dynamic input. In some embodiments, the dynamic input is received before an initial storage ranking to the monitored data element is assigned. In other embodiments in accordance with the disclosure, the dynamic input is received after the initial storage ranking is assigned or at the same time that the threshold storage ranking is assigned. In some embodiments, multiple dynamic inputs are received at different times. As shown at block 404, the method 400 also includes assigning an initial storage ranking to the monitored data element. As shown at block 406, the method 400 includes determining a threshold storage ranking. Next, as shown at block 407, the initial storage ranking is compared to the threshold storage ranking. As shown at block 408, the method 400 includes an assessment of whether the initial storage ranking exceeds the threshold storage ranking. If the initial storage ranking does not exceed the initial storage ranking, in some embodiments the monitored data element is discarded, as shown at block 410. If the initial storage ranking exceeds the threshold storage ranking, as shown at block 412, the method 400 includes storing the ranked monitored data element in long-term storage. Next, as shown at block 413, another dynamic input is received. The method 400 then includes, as shown at block 414, assigning an updated storage ranking to the monitored data element that is retained in long-term storage. Next, an assessment is made of whether the updated storage ranking exceeds the threshold storage ranking, as shown at block 416. If the updated storage ranking exceeds the threshold storage ranking, the ranked monitored data element is retained in long-term storage, as shown at block 412. If the updated storage ranking does not exceed the threshold storage ranking, as shown at block 410 the monitored data element is discarded.

Figure 7:
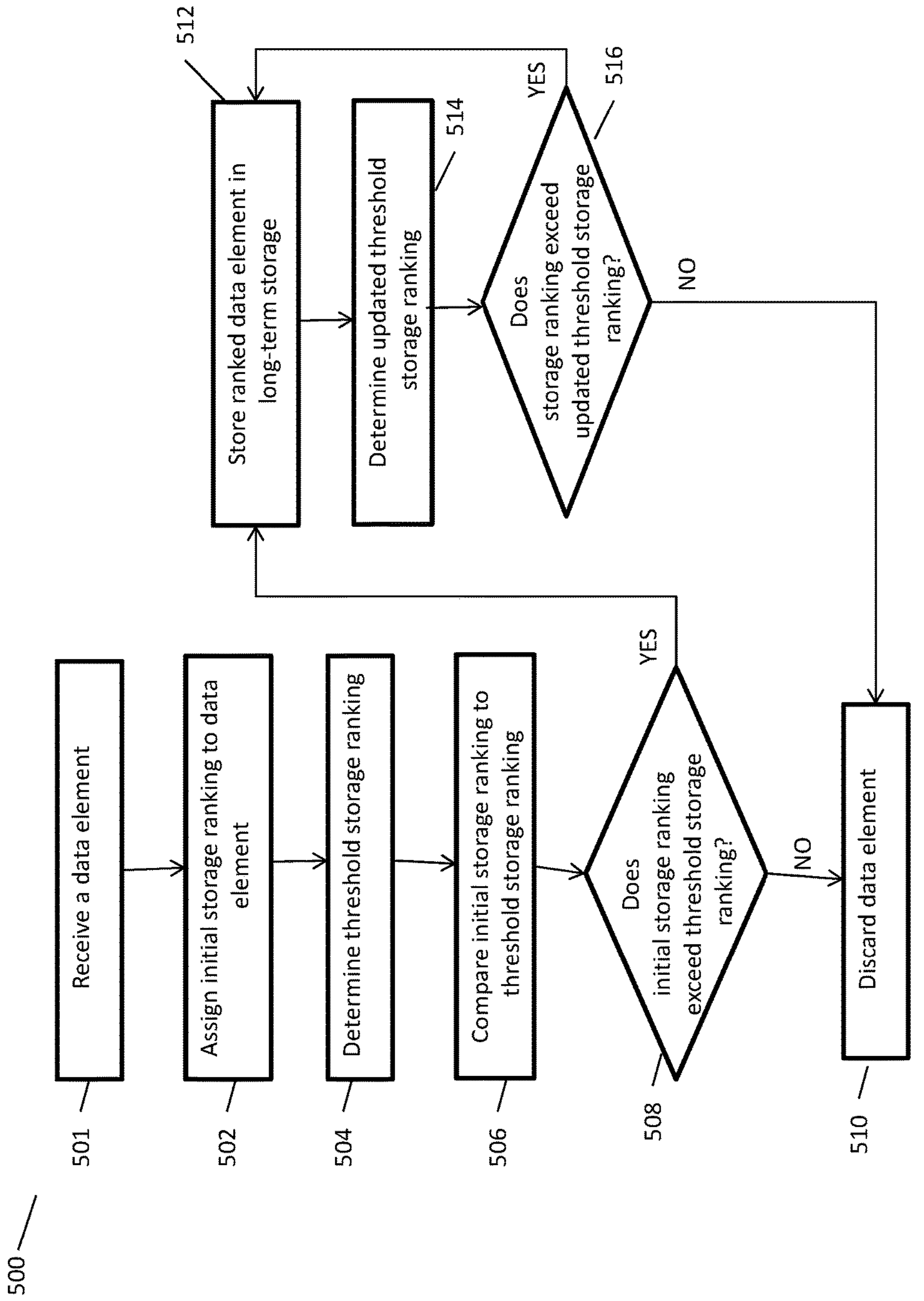
FIG. 7 is a flow diagram of yet another method for selective retention of data in accordance with an exemplary embodiment.

With reference now to FIG. 7, a flow diagram of a method 500 for selective retention of data in another exemplary embodiment is shown. As shown at block 501, the method 500 includes receiving a monitored data element. As shown at block 502, the method 500 also includes assigning an initial storage ranking to the monitored data element. As shown at block 504, the method 500 includes determining a threshold storage ranking. Next, as shown at block 506, the initial storage ranking is compared to the threshold storage ranking. As shown at block 508, the method 500 includes an assessment of whether the initial storage ranking exceeds the threshold storage ranking. If the initial storage ranking does not exceed the initial storage ranking, in some embodiments the monitored data element is discarded, as shown at block 510. If the initial storage ranking exceeds the threshold storage ranking, as shown at block 512, the method 500 includes storing the ranked monitored data element in long-term storage. The method 500 then includes, as shown at block 514, determining an updated threshold storage ranking. Next, an assessment is made of whether the storage ranking exceeds the updated threshold storage ranking, as shown at block 516. If the storage ranking exceeds the updated threshold storage ranking, the ranked monitored data element is retained in long-term storage, as shown at block 512. If the storage ranking does not exceed the updated threshold storage ranking, as shown at block 510 the monitored data element is discarded.

In accordance with some embodiments, one or more of the initial storage ranking, the threshold storage ranking, updated storage ranking, or updated threshold ranking, referred to collectively herein as "storage rankings," can be based upon dynamic input.

Dynamic input can be any information related to the desirability of retaining or discarding monitored data elements. For example, and not by way of limitation, dynamic input can include general or specific threat assessment information or risk determination information, including external threat intelligence, vulnerability assessment data, data concerning detective active threats on the network, real time malware levels, and the like. Dynamic input can also include, for example, information of whether a monitored data element is related to high or low risk business units, known security gaps in an environment, service disruption information, regulatory information, or litigation related information. Dynamic input can also include system information, such as the amount of available storage space or the current or potential system performance information. In some embodiments, static input can be provided, alone or in combination with dynamic input. Static information or real time information can be derived or obtained from any source and can change over time.

For example, a real time threat assessment including information concerning active threats on a network can reveal that certain monitored data elements previously retained in long-term storage are no longer high enough priority to retain in storage. In another example, an analytic measurement of real time malware levels on an internal network may reveal a sharp rise, thereby determining that the malware threat level is high. Thus, more monitored data elements could be saved until malware levels subside. Thus, a storage ranking can be adjusted in accordance with dynamic input received. In another example, a known indicator of compromise can be received from an external source for a particular piece of malware that is trending. In such a case, any data related to that known indicator can be assigned a high initial storage ranking. In some embodiments, initial storage ranking or threshold ranking can be cumulative across a plurality of criteria.

Storage rankings can also be based upon system information. For example, in one embodiment, an initial storage ranking of 50 can be assigned to a monitored data element and a threshold storage ranking can be 40, thus resulting in storing the ranked monitored data element in long-term storage. Over time, the system could experience reduced system performance or reduced storage capacity. In such a case, for instance, a threshold storage ranking can be updated to discard less important monitored data elements. In this example, raising the threshold storage ranking from 40 to 55 would allow the ranked monitored data element with the initial storage ranking of 50 to be discarded, thus improving system performance and increasing available storage.

In some embodiments, storage rankings can be based one multiple dynamic inputs. In some embodiments, storage rankings are based upon available storage and one or more of the physical location of the monitored flow, the logical location of the monitored flow, internal enterprise activity, such as upcoming product launch dates, internal threat measurements, such as malware levels, projections or indirect measures of future risks or threats that may be exploited; regulatory related information, litigation related information, or service or operational disruptions.

As used herein, "monitored data element" includes data that can be maintained for historic and/or forensic purposes. For example, data elements can include data included in network flows, including data flow packets and full captures of network activity, device logs, infrastructure data, application logs, security control event logs, and the like. In one embodiment, the monitored data element is a network data flow packet.

In one embodiment, monitored data elements can be selectively retained or discarded based upon available storage space. For example, a series of threshold storage rankings can be set to particular storage utilization percentages. In the example below, a storage utilization discard flow weight table can be provided, wherein Discard Flow Weighting represents the monitored data element's value or likelihood that the flow will be useful, such that values less than the discard flow weighting are discarded. Thus, in accordance with the example, four thresholds can be preset by a system administrator such that less information is retained in long-term storage with increasing storage utilization.

| Monitored data element ID | Storage Utilization | Discard Flow Weighting |
|---|---|---|
| 1 | <80% | 58 |
| 2 | 80% | 69 |
| 3 | 90% | 84 |
| 4 | >95% | 91 |

In another embodiment, monitored data elements can be selectively retained or discarded based upon search performance. For example, a series of threshold storage rankings can be set to particular search performance times. In the example below, a storage utilization discard flow weight table can be provided, wherein Discard Flow Weighting represents the monitored data element's value or likelihood that the flow will be useful, such that values less than the discard flow weighting are discarded. Thus, in accordance with the example, four thresholds can be preset by a system administrator such that less information is retained in long-term storage with increasing search time.

| Search Performance Measurement | Search Performance | Discard Flow Weighting |
|---|---|---|
| Fast | <30 seconds | 65 |
| Medium | 30 seconds to 1 minute | 73 |
| Slow | >1 minute <5 minutes | 87 |
| Very slow | >5 minutes | 95 |

In another embodiment, monitored data elements can be selectively retained or discarded based upon risk or threat criteria or importance of data flow. For example, a series of threshold storage rankings can be set based upon a variety of selection criteria, wherein the selection criteria include several attributes. In the example below, a storage utilization discard flow weight table can be provided, wherein Flow Weight represents the monitored data element's relative importance based upon one or more attributes.

| Selection_Criteria | Flow Weight |
|---|---|
| If monitored location = internet interface | 20 |
| If monitored location = internal interface | 5 |
| If content contains unannounced product code named "bluebunny" | 6 |
| if content is classified as "super top secret" | 50 |
| if flows malware threat level = low | 3 |
| if flows malware threat level = medium | 13 |
| if flows malware threat level = high | 22 |
| if operational state of environment = major outage | 25 |
| if FBI threat level = green | 1 |
| if FBI threat level = red | 45 |
| if Enterprise is being litigated | 30 |
| If Enterprise has received threats (i.e,. from hactivist) | 40 |
| If Enterprise is under attack | 70 |

In operation, in the above example, for each flow or storage item which is under consideration for storing to long-term storage or discarding, a probability that the flow will be useful in future forensic investigation is determined and then a storage action made. Higher Flow Weight can be assigned to more important data. For each Selection_criteria, a monitored data element can be assessed against the criteria and an aggregated flow weight calculated based upon each of the applicable criteria. Thereafter, an initial storage ranking can be assigned to the monitored data element.

In some embodiments, for current storage utilization, in operation a discard flow weighting can be determined. Thereafter, if the flow weight is greater than the discard flow weighting, then a monitored data element can be saved to long-term storage.

In some embodiments, monitored data elements in long-term storage are acted upon. For example, if flow package weight is less than discard flow weighting, then a monitored data element, such as a data flow packet, can be discarded, for example by deleting or archiving. Both the flow package weight and the discard thresholds can be dynamic in their valuation.

Figure 8:
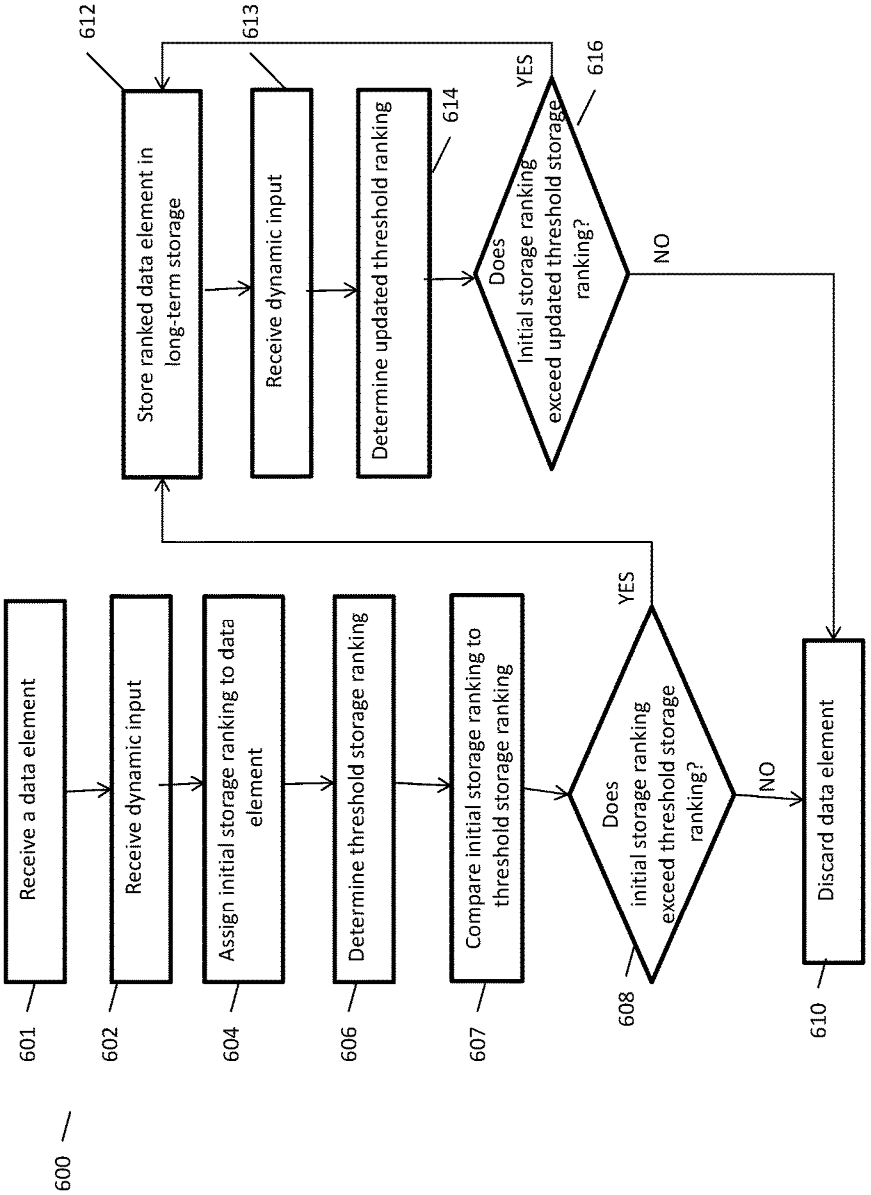
FIG. 8 is a flow diagram of another method for selective retention of data in accordance with an exemplary embodiment.

With reference now to FIG. 8, a flow diagram of a method 600 for selective retention of data in another exemplary embodiment is shown. As shown at block 601, the method 600 includes receiving a monitored data element. Next, as shown at block 602, the method 600 includes receiving a dynamic input. As shown at block 604, the method 600 also includes assigning an initial storage ranking to the monitored data element. As shown at block 606, the method 600 includes determining a threshold storage ranking. Next, as shown at block 607, the initial storage ranking is compared to the threshold storage ranking. As shown at block 608, the method 600 includes an assessment of whether the initial storage ranking exceeds the threshold storage ranking. If the initial storage ranking does not exceed the initial storage ranking, in some embodiments the monitored data element is discarded, as shown at block 610. If the initial storage ranking exceeds the threshold storage ranking, as shown at block 612, the method 600 includes storing the ranked monitored data element in long-term storage. Next, as shown at block 613, another dynamic input is received. The method 600 then includes, as shown at block 614, determining an updated threshold ranking. Next, an assessment is made of whether the initial storage ranking exceeds the updated threshold storage ranking, as shown at block 616. If the initial storage ranking exceeds the updated threshold ranking, the ranked monitored data element is retained in long-term storage, as shown at block 612. If the initial storage ranking does not exceed the updated storage ranking, as shown at block 610 the monitored data element is discarded.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for selective retention of data comprising:

receiving, by a storage, a monitored data element, assigning, by an analytics engine, an initial storage ranking to the monitored data element to create a ranked data element, determining, by a data selector, a threshold storage ranking, comparing, by the data selector, the initial storage ranking to the threshold storage ranking;

based upon the comparison indicating that the initial storage ranking is greater than the threshold storage ranking, storing the ranked data element in a long-term storage;

based upon the comparison indicating that the initial storage ranking is less than the threshold storage ranking, discarding the ranked data element;

assigning an updated storage ranking to the ranked data element to create a re-ranked data element;

calculating, based at least in part upon the dynamic input, an updated threshold storage ranking;

comparing the updated storage ranking to the updated threshold storage ranking;

based upon the comparison indicating that the updated storage ranking is greater than the updated threshold storage ranking, storing the ranked data element in a long-term storage; and based upon the comparison indicating that the updated storage ranking is less than the updated threshold storage ranking, discarding the ranked data element.

2. The method according to claim 1, further comprising receiving a dynamic input to the analytics engine.

3. The method according to claim 2, wherein the dynamic input is a threat assessment.

4. The method according to claim 2, wherein the dynamic input is a risk assessment.

5. The method according to claim 2, wherein the dynamic input is a capacity of the long-term storage.

6. The method according to claim 2, wherein the dynamic input is a system performance indication.

7. The method according to claim 2, wherein the initial storage ranking is based at least in part upon the dynamic input.

8. The method according to claim 1, wherein the updated storage ranking is based upon the dynamic input.

9. The method according to claim 2, wherein the dynamic input comprises two or more inputs.

10. The method according to claim 1, wherein the storage is a temporary storage.

11. The method according to claim 1, further comprising:
comparing the updated storage ranking to the threshold storage ranking;
based upon the comparison indicating that the updated storage ranking is greater than the threshold storage ranking, retaining the re-ranked data element in the long-term storage; and
based upon the comparison indicating that the updated storage ranking is less than the threshold storage ranking, discarding the re-ranked data element.

12. The method according to claim 1, further comprising calculating an updated threshold storage ranking.

13. The method according to claim 9, further comprising:
comparing the initial storage ranking of the ranked data element to the updated threshold storage ranking;
based upon the comparison indicating that the initial storage ranking is greater than the updated threshold storage ranking, retaining the ranked data element in the long-term storage; and
based upon the comparison indicating that the initial storage ranking is less than the updated threshold storage ranking, discarding the ranked data element.

14. A computer program product for selective retention of data on a computational system, the computer program product comprising:
a non-transitory storage medium readable by a processing circuit and storing instructions for execution by the processing circuit for performing a method comprising:
receiving, by a temporary storage, a monitored data element,
assigning, by an analytics engine, an initial storage ranking to the monitored data element to create a ranked data element,
determining, by a data selector, a threshold storage ranking, and
comparing, by the data selector, the initial storage ranking to the threshold storage ranking;
based upon the comparison indicating that the initial storage ranking is greater than the threshold storage ranking, storing the ranked data element in a long-term storage; and
based upon the comparison indicating that the initial storage ranking is less than the threshold storage ranking, discarding the ranked data element;
assigning an updated storage ranking to the ranked data element to create a re-ranked data element;
calculating, based at least in part upon the dynamic input, an updated threshold storage ranking;
comparing the updated storage ranking to the updated threshold storage ranking;
based upon the comparison indicating that the updated storage ranking is greater than the updated threshold storage ranking, storing the ranked data element in a long-term storage; and
based upon the comparison indicating that the updated storage ranking is less than the updated threshold storage ranking, discarding the ranked data element.

15. The computer program product of claim 14, wherein the method further comprises receiving a dynamic input to the analytics engine.

16. The computer program product of claim 15, wherein the initial storage ranking is based at least in part upon the dynamic input.

17. The computer program product of claim 15, wherein the method further comprises assigning, based at least in part upon the dynamic input, an updated storage ranking to the ranked data element to create a re-ranked data element.

18. A processing system for selective retention of data on a computational system, comprising:
a temporary storage configured to receive a monitored data element;
a processor in communication with the temporary storage, the processor comprising:
an analytics engine configured to assign an initial storage ranking to the monitored data element to create a ranked data element, and
a data selector configured to determine a threshold storage ranking and compare the initial storage ranking to the threshold storage ranking; and
a long-term storage configured to receive the ranked data element,
wherein the processor is configured to:
based upon the comparison indicating that the initial storage ranking is greater than the threshold storage ranking, storing the ranked data element in the long-term storage; and
based upon the comparison indicating that the initial storage ranking is less than the threshold storage ranking, discarding the ranked data element
assign an updated storage ranking to the ranked data element to create a re-ranked data element;
calculate, based at least in part upon the dynamic input, an updated threshold storage ranking;
compare the updated storage ranking to the updated threshold storage ranking;
based upon the comparison indicating that the updated storage ranking is greater than the updated threshold storage ranking, store the ranked data element in a long-term storage; and
based upon the comparison indicating that the updated storage ranking is less than the updated threshold storage ranking, discard the ranked data element.

* * * * *